United States Patent
Bruins et al.

(10) Patent No.: US 9,488,964 B2
(45) Date of Patent: Nov. 8, 2016

(54) METHODS FOR MAINTAINING ACCURATE TIMING INFORMATION ON PORTABLE ELECTRONIC DEVICES

(71) Applicant: Apple Inc., Cupertino, CA (US)

(72) Inventors: Jay N. Bruins, Los Altos, CA (US); Augustin Prats, San Francisco, CA (US); Glenn D. MacGougan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 14/475,216

(22) Filed: Sep. 2, 2014

(65) Prior Publication Data

US 2015/0378322 A1    Dec. 31, 2015

Related U.S. Application Data

(60) Provisional application No. 62/018,204, filed on Jun. 27, 2014.

(51) Int. Cl.

| | |
|---|---|
| *G04R 20/00* | (2013.01) |
| *G04R 20/14* | (2013.01) |
| *H04W 56/00* | (2009.01) |
| *G04R 20/26* | (2013.01) |
| *G04R 20/02* | (2013.01) |
| *H04L 29/06* | (2006.01) |

(52) U.S. Cl.
CPC ............ *G04R 20/00* (2013.01); *G04R 20/02* (2013.01); *G04R 20/14* (2013.01); *G04R 20/26* (2013.01); *H04L 69/28* (2013.01); *H04W 56/0015* (2013.01)

(58) Field of Classification Search
CPC ...... G04R 20/00; G04R 20/02; G04R 20/14; G04R 20/26; H04L 69/28; H04W 56/0015
See application file for complete search history.

(56) References Cited

U.S. PATENT DOCUMENTS

| 6,816,510 B1* | 11/2004 | Banerjee | H04B 7/269 370/350 |
| 7,035,246 B2* | 4/2006 | Taylor | H04J 3/0632 370/350 |
| 8,138,972 B2 | 3/2012 | Underbrink et al. | |
| 8,824,244 B2* | 9/2014 | Kato | G04R 20/10 368/47 |
| 8,837,530 B2 | 9/2014 | Agrawala et al. | |
| 8,930,579 B2* | 1/2015 | Pleasant | H04J 3/0664 709/218 |
| 2003/0185104 A1* | 10/2003 | Goergen | G04G 7/00 368/47 |

(Continued)

*Primary Examiner* — Vit W Miska
(74) *Attorney, Agent, or Firm* — Treyz Law Group, P.C.; Jason Tsai; Joseph F. Guihan

(57) ABSTRACT

Methods for operating portable electronic devices to maintain accurate timing information are provided. In one suitable arrangement, an electronic device may have a real-time clock and a mach-time clock that can be used separately to track the Coordinated Universal Time (UTC). The offset of the real-time clock and the mach-time clock from UTC can be monitored to determine if there is any oscillator frequency drift, which can be characterized using a linear model. Any variation in drift caused by environment factors such as temperature may also be characterized. In another suitable arrangement, a primary electronic device that is capable of maintaining accurate timing information may transfer that information to a secondary user device. Timing information may be transferred using mach-time values and may then be converted to real-time clock values to ensure that the secondary user device can estimate time accurately even when the device goes to sleep.

15 Claims, 10 Drawing Sheets

(56) References Cited

U.S. PATENT DOCUMENTS

| | | | |
|---|---|---|---|
| 2007/0191718 A1* | 8/2007 | Nakamura | A61B 5/0002 600/503 |
| 2007/0287930 A1* | 12/2007 | Sutton | A61M 21/00 600/544 |
| 2008/0031283 A1 | 2/2008 | Curran-Gray et al. | |
| 2010/0220748 A1* | 9/2010 | Inomata | G04G 5/00 370/503 |
| 2011/0035511 A1 | 2/2011 | Biederman | |
| 2012/0075439 A1 | 3/2012 | Gong et al. | |
| 2014/0016440 A1* | 1/2014 | Kato | G04R 20/10 368/47 |
| 2014/0133656 A1 | 5/2014 | Wurster et al. | |
| 2014/0177528 A1* | 6/2014 | Na | H04W 56/0015 370/328 |
| 2014/0340236 A1 | 11/2014 | Rhoads et al. | |
| 2015/0016476 A1* | 1/2015 | Herzog | H04N 21/242 370/503 |
| 2016/0041532 A1* | 2/2016 | Honda | G04R 20/02 368/47 |

* cited by examiner

METHODS FOR MAINTAINING ACCURATE TIMING INFORMATION ON PORTABLE ELECTRONIC DEVICES

This application claims the benefit of provisional patent application No. 62/018,204, filed Jun. 27, 2014, which is hereby incorporated by reference herein in its entirety.

BACKGROUND

This relates generally to electronic devices, and more particularly, to maintaining accurate timing information on portable electronic devices.

In general, it is desirable for electronic devices be able to provide accurate timing information. Users often rely on an electronic wristwatch or other portable electronic devices such mobile telephone devices, laptop computers, and tablet computers to provide the correct time. These devices typically include a time keeping component such as a quartz crystal oscillator. A quartz crystal oscillator is a component that uses the mechanical resonance of a vibrating piezoelectric material to create an electrical signal with a very precise frequency. A digital counter is controlled by this electrical signal and outputs a value that can be translated to useful timing information in the form of hours, minutes, and seconds.

Crystal oscillators are generally accurate to ±15 seconds per month. Environmental factors such as temperature, humidity, pressure, and vibration, as well as battery voltage and the age of the crystal itself, can affect the accuracy of the oscillators. Several techniques already exist to synchronize devices to a common time base, such as use of the Network Time Protocol (NTP) to synchronize to atomic clocks via the Internet or use of a Global Positioning System (GPS) receiver to synchronize to the timing information transmitted by each GPS satellite.

In some situations, a user may operate more than one electronic device. In such situations, it may be inefficient for multiple devices to have to separately synchronize to a common time base via NTP or GPS. It may be desirable for only one of the devices to first obtain accurate timing information, and then to transfer that accurate timing information to other associated devices.

SUMMARY

Methods for operating portable electronic devices to handle accurate timing information are provided. In one suitable embodiment, a primary user device may be used to transfer timing information onto a secondary user device. The primary user device may be a smart phone, whereas the secondary user device may be a wrist-watch device (as an example).

To initiate the time transfer procedure, the secondary user device may send a time transfer request to the primary user device. In response to receiving the time transfer request from the secondary user device, the primary user device may be used to obtain a first wake-only counter value (e.g., a hardware counter value that is maintained at an applications processor within the primary user device) and to obtain an approximation of the current time-of-day (i.e., an approximation of the Coordinated Universal Time).

The primary user device may then send the first wake-only counter value and optionally the current time-of-day approximation to the secondary user device. In response to receiving these values, the secondary user device may be used to obtain a second wake-only counter value (e.g., a hardware counter value that is maintained at an applications processor within the secondary user device). After obtaining the second wake-only counter value, the secondary user device may send an acknowledgement to the primary user device.

When the primary user device receives the acknowledgement from the secondary user device, the primary user device may be used to latch a third wake-only counter value using its applications processor. The third wake-only counter value may then be forwarded to the secondary user device. The secondary user device may then compute a new wake-only counter value that corresponds to the first wake-only counter value based on the first wake-only counter value, the second wake-only counter value, and the third wake-only counter value. For example, the new wake-only counter time may be computed by calculating the difference between the first and third wake-only counter values and then subtracting that difference from the second wake-only counter value. The applications processor on the secondary user device may then be used to compute a persistent counter value that corresponds to the second wake-only counter value.

In another suitable embodiment, the offset between the wake-only counter value and UTC and the offset between the persistent counter value and UTC may be characterized. The wake-only counter and persistent counter values may be maintained using counters having separate crystal oscillators having frequencies that can drift over time. As a result, the offset values from UTC can change as time passes. The offset values can be periodically sampled to characterize the rate at which the frequency of the oscillator drifts. Since the amount of frequency drift is relatively constant, the change in offset can be characterized using a linear model. As the linear model matures with more sampled data points, the frequency at which offset values are sampled can be reduced. If desired, the device may also include a sensor that can be used to monitor how the frequency drift can be affected by operating parameters such as temperature, humidity, pressure, vibration, and other desired factors.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Generally, embodiments described herein may relate to improving timing accuracy on one user electronic device and to transfer its timing to another user electronic device. Individually, suitable electronic devices may attempt to periodically synchronize to timing information received from Global Positioning System (GPS) satellites, to timing information received via the Internet using a Network Time Protocol (NTP), or to timing information received via cellular networks (e.g., via CDMA/1x networks, LTE networks, etc.). The GPS time is generally considered the most accurate time available. The NTP time is generally less accurate than the GPS time but is still relatively accurate compared to any old timing information that has not been recently updated on a device.

Figure 1:
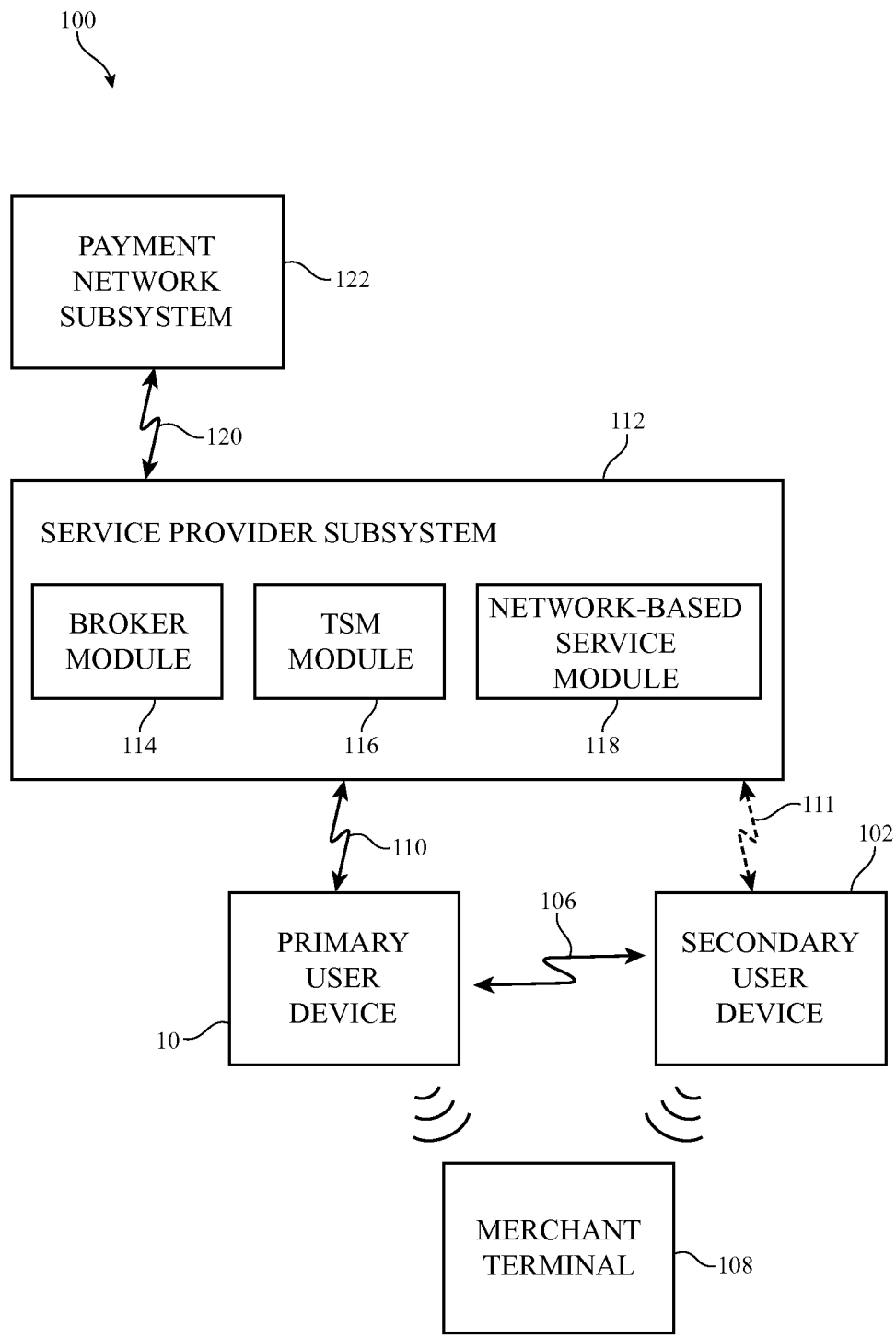
FIG. 1 is a diagram of an illustrative system for in which one or more user devices can be used to perform mobile payment transactions in accordance with an embodiment.

In at least some embodiments, the electronic devices that are used to maintain accurate timing information may be provisioned with commerce credential information to enable the mobile payments capability. FIG. 1 shows a diagram of a system 100 in which credential information can be provisioned onto one or more electronic devices from a payment network subsystem 122 using a service provider subsystem 112. User devices that have been provisioned with commerce credentials from payment network subsystem 122 may be used to conduct a financial transaction with a merchant terminal such as merchant terminal 108. User devices may, for example, communicate with merchant terminal 108 via contactless proximity-based communications (e.g., using near field communications (NFC) standards). Terminal 108 (sometimes referred to as a "point-of-sale" terminal) may include an NFC reader for detecting, reading, or otherwise receiving information from a nearby electronic device.

For example, a user may hold an electronic device within range of merchant terminal 108 to initiate a commercial transaction. Actual physical contact between the user device and the merchant terminal need not be present. While the electronic device is within range of merchant terminal 108 (e.g., when the user device is within 10 cm of terminal 108, when the user device is within 5 cm of terminal 108, when the user device is within 1 cm of terminal 108, or when the distance between the user device and the merchant terminal has other suitable values), the electronic device may send a selected commerce credential to merchant terminal 108. In response to receiving the selected commerce credential, merchant terminal 108 may complete the payment by forwarding the received commerce credential to a corresponding payment processor (not shown). The payment processor may utilize the user commerce credential to complete the transaction with payment network subsystem 122. This example in which payment transactions are performed via NFC is merely illustrative and does not limit the scope of the present invention. If desired, financial transactions between any two electronic devices may be carried out over Bluetooth® communications links, personal area network (PAN) communications links, wireless local area network (WLAN) communications links, or other short-range wireless communications links.

Payment network subsystem 122 may be operated by a financial entity that includes a network of various issuing banks and/or acquiring banks (e.g., payment processors). The financial entity at the payment network subsystem 122 may serve as a generic payment card association (e.g., a credit card association) that partners with one or more issuing/acquiring banks that are associated with different brands of commerce credentials and may sometimes be referred to as a payment network operator. The payment network operator and associated issuing/acquiring banks may be a single entity or separate entities.

For example, American Express may be both a payment network operator and an issuing/acquiring bank. As another example, Visa and MasterCard may be a payment network operator that partners with other issuing/acquiring banks such as Bank of America, Wells Fargo, and Chase, just to name a few. The issuing bank may be the financial institution that assumes primary liability for each user's capability to pay off debts incurred using a particular brand of payment card. Various types of payment cards that can be issued may include but are not limited to: credit cards, debit cards, charge charges, stored-value cards, fleet cards, and gift cards.

User payment card credentials may be provisioned from such financial entities onto user devices using a service provider subsystem such as service provider subsystem 112. Service provider subsystem 112 may be configured to provide another layer of security and/or to provide a more seamless user experience. For example, service provider subsystem 112 may be operated by a commercial service entity that offers various services to the user, which may include: an online store for selling/renting media to be played by the user device, an online store for selling/renting applications to be run on the user device, an online storage service for backing up and synchronizing data among multiple user devices, a remote device management service for tracking the location of the user device and remotely controlling that device, an online store that allows the user to purchase additional user devices or products (e.g., products manufactured by that commercial entity), etc. As another example, service provider subsystem 112 may be operated by a mobile network operator such as Verizon or AT&T.

In either scenario, the commercial entity at the service provider subsystem 112 may at least provide different users with their own personalized accounts for accessing the services offered by that commercial entity. Each user account may be associated with a personalized user identification (or account ID) and password that the user may use to log in into his/her account. Once logged in, the user may be presented with the opportunity to provision one or more commerce credentials (e.g., payment cards) onto the user device to enable the user device to purchase items using services offered by the commercial entity and/or to perform financial transactions at a merchant terminal 108.

In general, the commercial entity at the service provider subsystem 112 and the financial entity at the payment network subsystem 122 are considered separate entities. The commercial entity may leverage any known credential information associated with each of its user accounts to more securely determine whether a specific credential offered by the payment network operator ought to be provisioned onto a given user device. If desired, the commercial entity may also leverage its ability to configure or control various components of the user device (e.g., via software of firmware updates) in order to provide a more seamless experience for the user when he or she wants to provision a credential offered by the payment network operator onto a given user device.

As shown in FIG. 1, service provider subsystem 112 may include a broker module 114, a trusted service manager (TSM) module 116, and a network-based service module 118. Broker module 114 may serve to manage user authentication with a commercial entity user account and may also serve to manage the lifecycle and provisioning of credentials onto a user device. Broker module 114 may also be configured to control the user interface (e.g., the graphical user interface) that is displayed on the user device and to process any user inputs related to provisioning commerce credentials on the user device. When it is desired to provision a card onto the user device, broker module 114 may send a notification to payment network subsystem 122 via path 120.

In response to receiving the notification from broker module 114, payment network subsystem 122 may communicate directly with TSM module 116 to carry out credential provisioning operations on the user device. TSM 116 may serve to provide GlobalPlatform or other secure transactions based services so that TSM 116 can set up a secure channel between service provider subsystem 112 and a secure element within the user device. Commerce credential, payment card information, and/or other sensitive account data may then be conveyed to the secure element in the device via the secure channel. In general, TSM 116 may use public/private keys or other cryptographic schemes to ensure that communication between service provider subsystem 112 and the secure element within the user device is secure.

Network-based service module 118 may serve to allow users to store data such as music, photos, videos, contacts, multimedia messages, emails, calendars, notes, reminders, applications, documents, device settings, and other information on a network of computing servers so that data can be synchronized across multiple user devices (e.g., module 118 allows users to back up data that is stored on their devices onto servers associated with the service provider subsystem). This backup data can be used to restore a user device or to set up new user devices (as examples).

Network-based service module 118 may also be configured to allow users to find lost devices (sometimes referred to as a "Find My Device" feature), to share media among different devices, and/or to keep sensitive information (e.g., commerce credential information, website account login information, Wi-Fi® account information, etc.) up to date across different user devices. Any sensitive user information may be stored as part of a user "keychain" that can be stored on the user device(s) and/or on the network-based service module 118. Only the authorized user should have access to the keychain. Contents in the keychain may be protected using industry standard encryption techniques (e.g., using at least 128-bit AES encryption). Module 118 configured in this way is sometimes referred to as a "cloud" storage or cloud computing module.

Still referring to FIG. 1, a user may be in possession of multiple devices such as devices 10 and 102. Device 10 may be referred to as a "primary" user device, whereas device 102 may be referred to as a "secondary" user device. In general, the primary user device 10 may be provided with more functions than the secondary user device 102. For example, primary user device 10 may serve as the user's main device for use in accessing an entire array of services offered by service provider subsystem 112, for making telephone calls, for selecting new cards to be provisioned on one of devices 10 and 102, for capturing images, and for accessing the Internet, whereas secondary user device 102 may serve as an accessory device for use in accessing only a subset of the services provided by the commercial entity at the service provider subsystem 112. However, it should be understood that the terms "primary" and "secondary" are used for ease of description and that, in some instances, the "secondary" device implement functionality identical to or greater than the functionality implemented by the "primary" device.

Either one of primary user device 10 or secondary user device 102 can be used to perform a mobile payment transaction at merchant terminal 108. Each device that is capable of conducting such types of NFC-based financial transactions may be provided with a secure element. The secure element may be a tamper-resistant component (e.g., as a single chip or multichip secure microcontroller) that is capable of securely hosting applications and their confidential and cryptographic data in accordance with rules and security requirements set forth by well-identified trusted authorities such as GlobalPlatform.

Figure 2A:
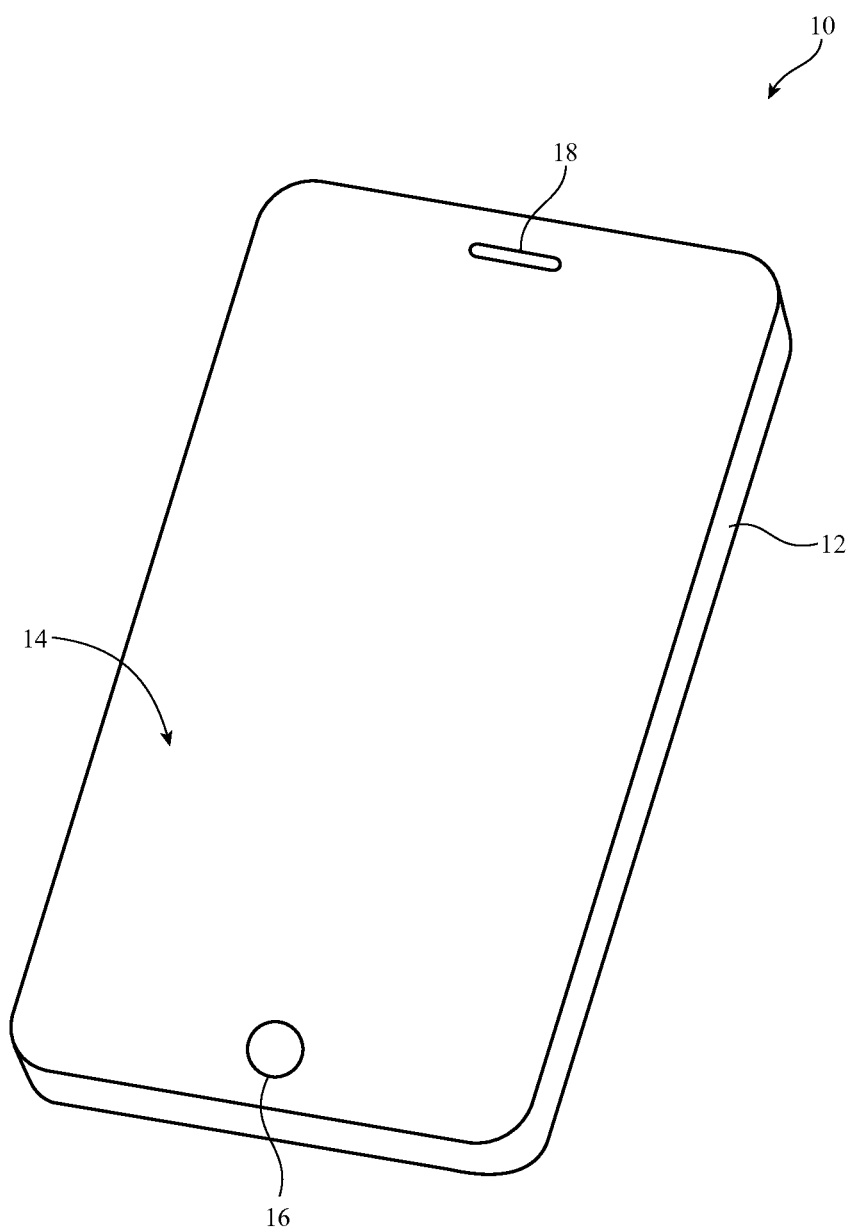
FIG. 2A is a perspective view of an illustrative primary user device in accordance with an embodiment.

FIG. 2A shows a perspective view of primary user device 10. Device 10 may be a portable device such as a cellular telephone, media player, tablet computer, or other portable computing device. The example of FIG. 2A is merely illustrative. Other configurations may be used for device 10, if desired. As shown in FIG. 2A, device 10 may include a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.).

Figure 2B:
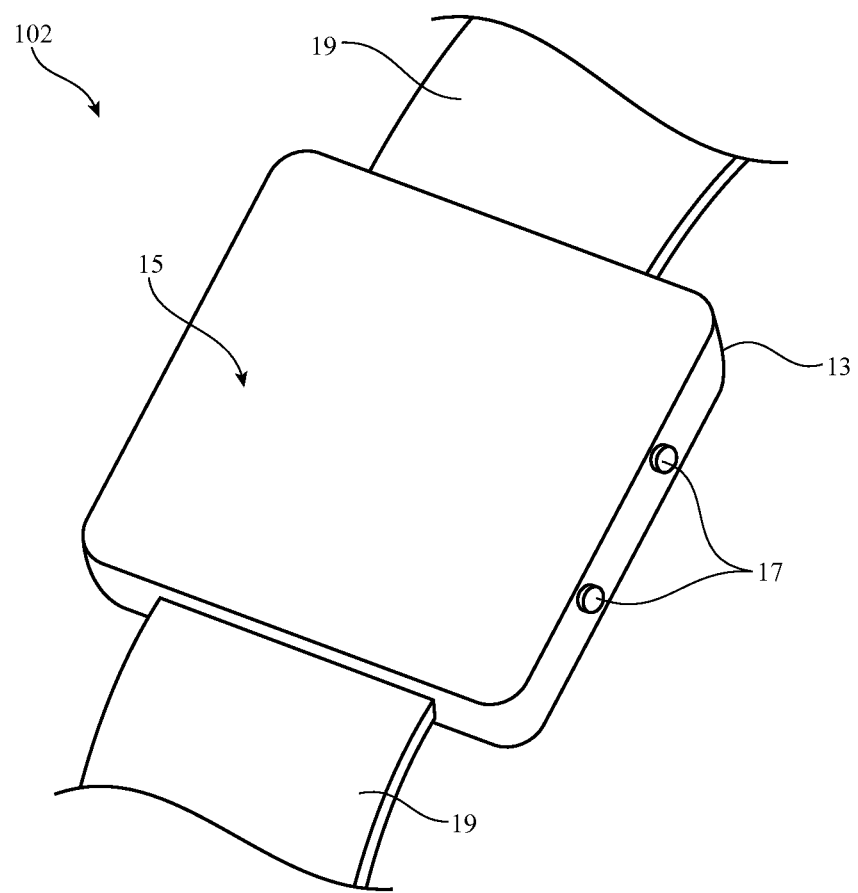
FIG. 2B is a perspective view of an illustrative secondary user device in accordance with an embodiment.

FIG. 2B shows a perspective view of a secondary user device 102. Electronic device 102 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In at least some embodiments, secondary user device 102 serves as an auxiliary device to primary device 10, where device 102 can be used to perform specialized functions for the user. The primary device 10 is sometimes considered a "companion" device to the secondary user device 102.

The example of FIG. 2B in which device 102 is shown as a wearable device such as a wrist-watch device with straps 19 is merely illustrative. As shown in FIG. 2B, device 102 may include a display such as display 15. Display 15 has been mounted in a housing such as housing 13. Housing 13, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 13 may be formed using a unibody configuration in which some or all of housing 13 is machined or molded as a single structure or may be formed using multiple structures (e.g., an internal frame structure, one or more structures that form exterior housing surfaces, etc.).

Display 15 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 15 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Display 15 may be protected using a display cover layer such as a layer of transparent glass or clear plastic.

Device 102 may have one or more buttons 17 which may be used to gather user input. Buttons 17 may be based on dome switches or other switch circuitry. Buttons 17 may include button members that form push buttons (e.g., momentary buttons), slider switches, rocker switches, etc. Device 10 may also have additional buttons, a speaker port, data ports such as a digital data port and an audio connector port, and/or other input-output devices, if desired. In some embodiments, at least one of buttons 17 on the secondary user device 102 may be used to enable device 102 to perform a secure mobile transaction.

Figure 3:
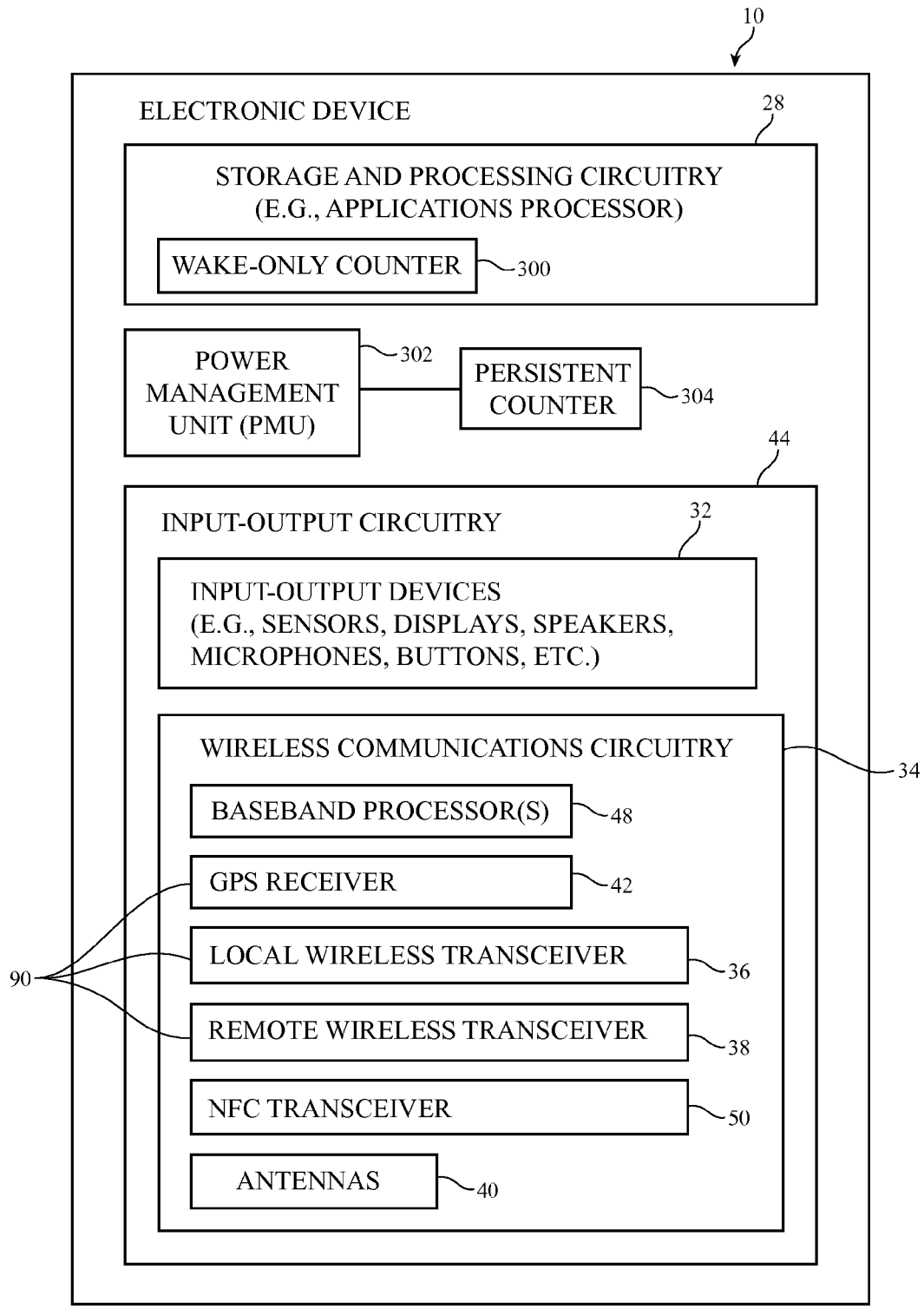
FIG. 3 is a schematic diagram of illustrative circuitry in the primary user device of FIG. 1 in accordance with an embodiment.

A schematic diagram showing illustrative components that may be used in device 10 is shown in FIG. 3. As shown in FIG. 3, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, secondary device credential management applications, etc. Circuitry 28 is therefore sometimes referred to as an "applications processor" or AP. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

As shown in FIG. 3, the applications processor 28 may include a wake-only counter such as counter 300. The output value of wake-only counter 300 may sometimes be referred to as an AP clock or a "mach-time" clock (MTC). Wake-only counter 300 may only increments its count value whenever applications processor (AP) 28 is active. If, however, the applications processor is idle or placed in sleep mode (sometimes referred to as a low power mode), counter 300 may be temporarily disabled so that the mach-time clock remains fixed at its current value. When the applications processor is awakened from the sleep mode, the wake-only counter 300 may be re-enabled so that the mach-time clock may again start to increment. In at least some arrangements, the mach-time clock generated by counter 300 may be reset to zero whenever device 10 is rebooted. The wake-only counter is sometimes referred to as the mach-time counter.

Device 10 may also include a power management unit (PMU) such as PMU 302. PMU 302 may, for example, be a microcontroller that governs the power functions for device 10. The PMU 302 should remain active (e.g., using a backup battery source) even when the rest of device 10 is idle or powered down. For example, the power management unit 302 remains active even when the applications processor 28 is in sleep mode. The PMU 302 may be responsible for functions including but not limited to: monitoring power connections and battery charges, controlling power to other circuit components within device 10, shutting down unnecessary system components when they are left idle, controlling sleep and on/off power functions, and/or actively managing power consumption for optimum user performance.

In the example of FIG. 3, power management unit 302 may be coupled to a persistent counter such as persistent counter 304. Persistent counter 304 (as implied by its name) may remain powered even when the rest of the device is powered off (e.g., counter 304 may be powered by the backup battery source in the power management unit). Counter 304 may be controlled by an oscillator having a frequency of approximately 32 kHz (as an example). In general, the persistent counter 304 begins counting when device 10 is manufactured for the first time. The output value of persistent counter 304 may sometimes be referred to as a "real-time" clock or RTC. While the mach-time clock stops whenever the applications processor 28 is idle/sleeping and may be reset when device 10 is powered off, the real-time clock will continually increment its value whether or not the applications processor 28 is idle and whether or not the device 10 is actively powered. The persistent counter is sometimes referred to as the RTC counter.

Referring still to FIG. 3, device 10 may also include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may also include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36 and 38. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Wireless communications circuitry 34 may also include satellite navigation system circuitry such as global positioning system (GPS) receiver circuitry 42 for receiving GPS signals at 1575 MHz or for handling other satellite positioning data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may also include near-field communications circuitry 50. Near-field communications circuitry 50 may produce and receive near-field communications signals to support communications between device 10 and a near-field communications reader or other external near-field communications equipment. Near-field communications may be supported using loop antennas (e.g., to support inductive near-field communications in which a loop antenna in device 10 is electromagnetically near-field coupled to a corresponding loop antenna in a near-field communications reader). Near-field communications links typically are generally formed over distances of 20 cm or less (i.e., device 10 must be placed in the vicinity of the near-field communications reader for effective communications).

Transceiver circuitry 90 and NFC circuitry 50 may be coupled to one or more baseband processors 48. Baseband processor 48 may receive digital data to be transmitted from circuitry 28 and may supply corresponding signals to at least one of wireless transceiver circuits 90 for wireless transmission. During signal reception operations, transceiver circuitry 90 and NFC circuitry 50 may receive radio-frequency signals from external sources (e.g., wireless base stations, wireless access points, GPS satellites, NFC readers etc.). Baseband processor 48 may convert signals received from circuitries 90 and 50 into corresponding digital data for circuitry 28. The functions of baseband processor 48 may be provided by one or more integrated circuits. Baseband processor 48 is sometimes considered to be part of storage and processing circuitry 28.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near-field communications. The structures of antennas 40 may also be used in gathering proximity sensor signals (e.g., capacitive proximity sensor signals).

Radio-frequency transceiver circuitry 90 does not handle near-field communications signals and is therefore sometimes referred to as "far field" communications circuitry or non-near-field communications circuitry (e.g., transceiver circuitry 90 may handle non-near-field communications frequencies such as frequencies above 700 MHz or other suitable frequency). Near-field communications transceiver circuitry 50 may be used in handling near-field communications. With one suitable arrangement, near-field communications can be supported using signals at a frequency of 13.56 MHz. Other near-field communications bands may be supported using the structures of antennas 40 if desired.

Figure 4:
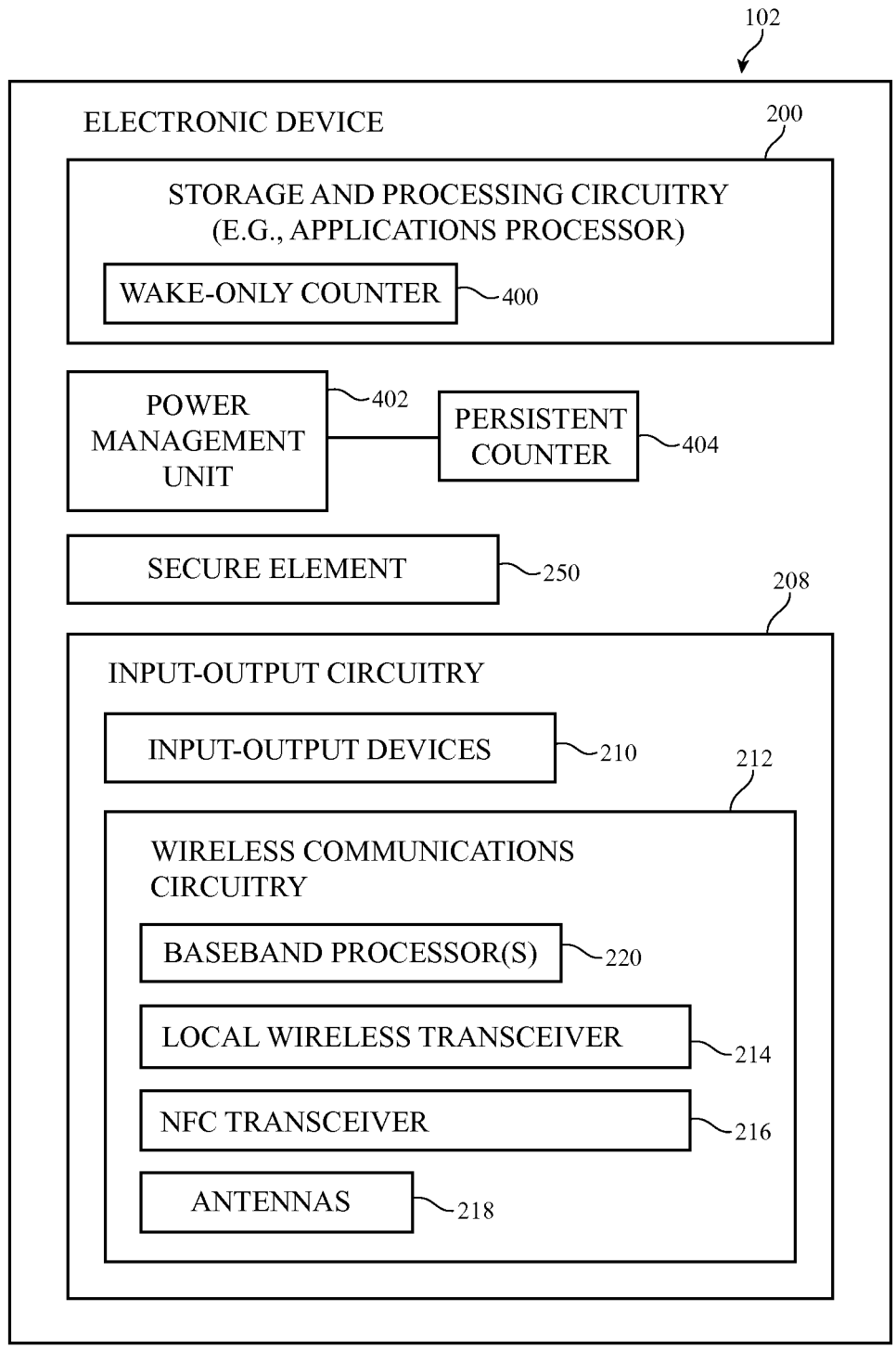
FIG. 4 is a schematic diagram of illustrative circuitry in the secondary user device of FIG. 1 in accordance with an embodiment.

A schematic diagram showing illustrative components that may be used in the secondary user device 102 is shown in FIG. 4. As shown in FIG. 4, device 102 may include control circuitry such as processing circuitry 200. Circuitry 200 may also include storage such as hard disk drive storage, nonvolatile memory, volatile memory, etc. Processing circuitry 200 may be used to control the operation of device 10, to run one or more applications on device 102, and is sometimes referred to as an applications processor (AP). For example, processing circuitry 200 may be used to run software on device 102, such as internet browsing applications, voice-over-internet-protocol (VOIP) telephone call applications, email applications, media playback applications, operating system functions, mobile transactions applications, NFC applications, etc. Processing circuitry 200 may be based on one or more microprocessors, microcontrollers, digital signal processors, application specific integrated circuits, etc.

As shown in FIG. 4, the applications processor 200 of device 102 may include a wake-only counter 400. Similar to the wake-only counter 300 of device 10, wake-only counter 400 may increment a corresponding mach-time clock value only when the applications processor 200 is active. If, however, applications processor 200 is idle or placed in sleep mode, the wake-only counter may be temporarily disabled so that the mach-time clock of device 102 remains fixed at its current value. When the applications processor 200 is awakened from the sleep mode, the mach-time counter 400 may be re-enabled so that the mach-time clock may again start to increment. In at least some arrangements, the mach-time clock output by counter 400 may be reset to zero whenever device 102 is restarted.

Device 102 may also include a power management unit (PMU) such as PMU 402. PMU 402 may be a non-reconfigurable microcontroller that governs the power functions for device 102. The PMU 402 should remain active (e.g., using a backup battery source) even when the rest of device 102 is idle or powered down. Unit 402 may be responsible for functions including but not limited to: monitoring power connections and battery charges, controlling power to other circuit components within device 102, shutting down unnecessary system components when they are left idle, controlling sleep and on/off power functions, and/or actively managing power consumption for optimum user performance.

Power management unit 402 may also be coupled to a persistent counter 404. Counter 404 may remain powered even when the rest of the device 102 is powered off (e.g., counter 404 may be powered by the backup battery source in the power management unit). The output value of persistent counter 404 may sometimes be referred to as a "real-time" clock or RTC of device 102. In general, the real-time clock counter 404 begins counting when device 102 is manufactured for the first time.

As described above in connection with FIG. 1, auxiliary user device 102 may include a secure element (SE) 250. The secure element (SE) 250 may be provided as a universal integrated circuit card (UICC), an embedded SE, a smart secure digital (SD) card, a microSD card, etc. Sensitive user information such as credit card information and other commerce credentials may be stored on the secure element. The secure element provides a secure domain that protects the user's credentials and processes desired payment transactions in a trusted environment without compromising the safety of the user's data.

Still referring to FIG. 4, device 102 may also include input-output circuitry 208. Input-output circuitry 208 may include input-output devices 210. Input-output devices 210 may be used to allow data to be supplied to device 102 and to allow data to be provided from device 102 to external devices. Input-output devices 210 may include user interface devices, data port devices, and other input-output components. For example, input-output devices 210 may include touch screens, displays without touch sensor capabilities, buttons, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 208 may include wireless communications circuitry 212 for communicating wirelessly with external equipment. Wireless communications circuitry 212 may include local wireless transceiver circuits 214 that may handle 2.4 GHz and 5 GHz bands for WiFi® (IEEE 802.11) communications, the 2.4 GHz Bluetooth® communications band, or other short range communications bands for communicating with primary user device 10, additional user devices, or other external equipment that may be only tens or hundreds of feet away from device 102. If desired, device 102 may also include remote wireless transceiver circuits (not shown) such as cellular telephone transceiver circuitry for handling cellular telephone bands, global positioning system (GPS) receiver circuitry for handling GPS signals at 1575 MHz or for handling other satellite positioning data, or other long range communications bands for communicating with external equipment that may be thousands of feet or miles away.

Wireless circuitry 212 may also include near-field communications circuitry 216. Near-field communications circuitry 216 may produce and receive near-field communications signals to support communications between device 102 and a near-field communications reader (e.g., point-of-sale terminal 108) or other external near-field communications equipment. Near-field communications may be supported using loop antennas (e.g., to support inductive near-field communications in which a loop antenna in device 102 is electromagnetically near-field coupled to a corresponding loop antenna in a near-field communications reader). Near-field communications links typically are generally formed over distances of 20 cm or less (i.e., device 102 must be placed in the vicinity of the near-field communications reader for effective communications).

The transceiver circuits of circuitry 212 may be coupled to one or more baseband processors 220. Baseband processor 220 may receive digital data to be transmitted from processor 200 and may supply corresponding signals to at least one of wireless transceiver circuits 214 and 216 for wireless transmission (as an example). During signal reception operations, transceiver circuits 214 and/or 216 may receive radio-frequency signals from external sources (e.g., wireless access points, another user device, NFC readers, etc.). Baseband processor 220 may convert the received signals into corresponding digital data for processor 200. The functions of baseband processor 220 may be provided by one or more integrated circuits.

Wireless communications circuitry 212 may include one or more antennas 218. Antennas 218 may be formed using any suitable antenna types. For example, antennas 218 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming an NFC antenna. With one suitable arrangement, near-field communications can be supported using signals at a frequency of 13.56 MHz. Other near-field communications bands may be supported using the structures of antennas 218, if desired. The structures of antennas 218 may also be used in gathering proximity sensor signals (e.g., capacitive proximity sensor signals).

Figure 5:
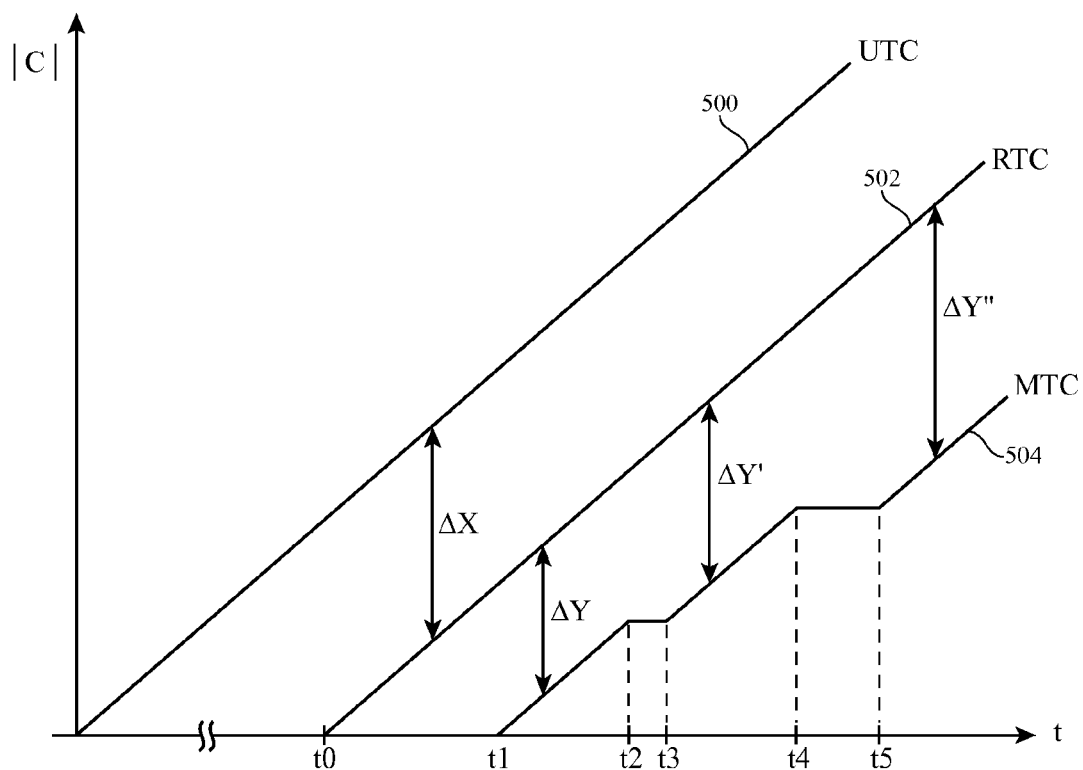
FIG. 5 is a timing diagram illustrating different types of time counters on an electronic device in accordance with an embodiment.

As described in connection with FIGS. 3 and 4, an electronic device may include multiple counters for keeping track of time. FIG. 5 shows three different types of counters that can be obtained using a portable electronic device (e.g., device 10 of FIG. 3 or device 102 of FIG. 4). Line 500 represents the Coordinated Universal Time or "UTC" that is defined by the International Telecommunications Union Recommendation and is based on the International Atomic Time with leap seconds added at irregular intervals to compensate for the change in Earth's rotation. The UTC is considered the primary standard/reference time with which all other clocks should be synchronized. As described above, the GPS timing information received from corresponding satellites may be relatively accurate and may serve as sufficiently accurate approximations of the UTC (e.g., timing information gathered using the GPS receiver may be forwarded to the baseband processor, which can then be retrieved by the applications processor for further processing).

As shown in FIG. 5, line 502 may represent the real-time clock (RTC), whereas line 504 may represent the mach-time clock (MTC). The real-time clock 502 may begin incrementing its value when the device is first manufactured at the factory (e.g., at time t0). RTC 502 should continue to increment its value as long as the power management unit is not completely drained. On the other hand, the mach-time clock 504 may begin incrementing its value when the device is first powered on (e.g., at time t1). The MTC 504 may continue to increment its value as long as the applications processor remains active. Whenever the applications processor is inactive, however, the MTC may remain constant during these idle time periods (see, e.g., time t2-t3 or time t4-t5).

At any point in time, the device may obtain a UTC sample and an RTC sample. The value output by the RTC is simply an arbitrary hardware counter value that may be offset from the UTC by some offset amount ΔX. If this offset stays fixed, the device can easily compute the UTC based on the current RTC without having to constantly obtain timing information from the GPS satellites or via NTP (e.g., UTC=RTC+ΔX).

The RTC value can be retrieved using the power management unit (e.g., using the PMU 302 of FIG. 3 and PMU 402 of FIG. 4). The RTC value is, however, not as readily available as the mach-time value. The mach-time clock value is simply an arbitrary hardware counter value, which can be offset from the RTC by some offset amount ΔY. The MTC value is maintained at the applications processor (as described in connection with FIGS. 3 and 4 using wake-only counters 300 and 400, respectively), so the applications processor can readily retrieve this information with the least amount of latency (compared to obtaining RTC via the power management unit). The MTC value, however, can sometimes pause during applications processor (AP) idle periods, which can result in the offset between the RTC and the MTC to change. In FIG. 5, for example, the offset between RTC and MTC may be equal to ΔY between time t1 and t2, but may increase to ΔY' after the first AP sleep period (i.e., from time t2 to t3) and may further increase to ΔY" after the second AP sleep period (i.e., from time t4 to t5). Thus, even though the MTC is faster to obtain, it is generally desirable to map the MTC values to RTC values since the RTC values are monotonically increasing whether or not the rest of the device is active.

Figure 6:
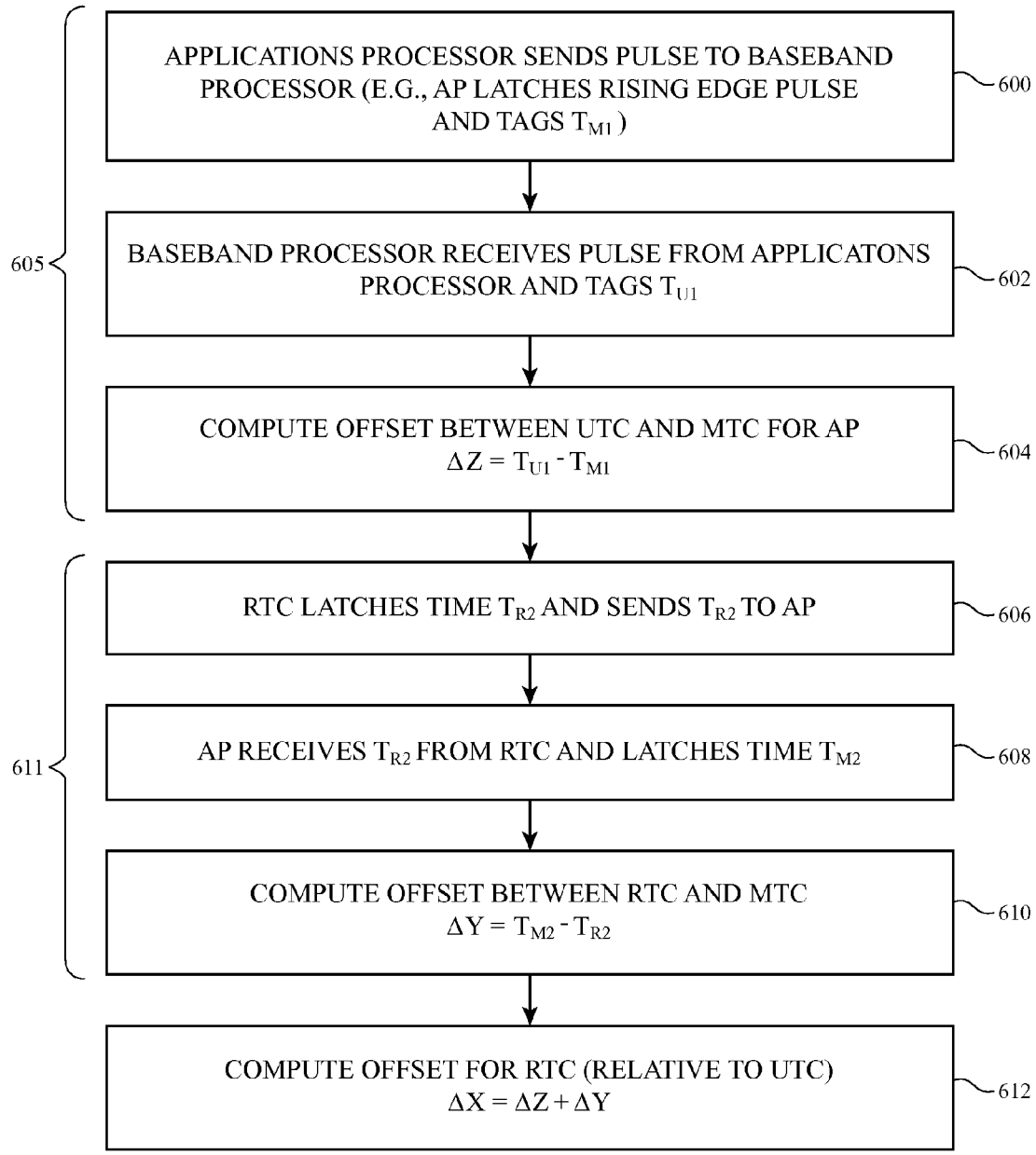
FIG. 6 is a flow chart of illustrative steps involved in computing offset values between the different types of time counters of the type shown in FIG. 5 in accordance with an embodiment.

FIG. 6 is a flow chart of illustrative steps involved in computing offset values among UTC, RTC, and MTC. At step 600, the applications processor may be configured to send a pulse to the baseband processor. When doing so, the applications processor may latch the rising edge of the pulse and obtain a corresponding time tag $T_{M1}$.

At step 602, the baseband processor may receive the pulse from the applications processor and may obtain a current timing approximation of UTC (e.g., an approximation obtained via GPS or NTP) as tag $T_{U1}$. Tag $T_{U1}$ may then be sent back to the applications processor. Assuming the time to send tag $T_{U1}$ from the baseband processor to the applications processor is negligible, the applications processor may be used to compute an offset ΔZ between UTC and MTC by taking the difference between $T_{U1}$ and $T_{M1}$ (e.g., $\Delta Z = T_{U1} - T_{M1}$), at step 604. Steps 605 (i.e., steps 600, 602, and 604) may therefore be used to identify an amount of offset ΔZ between UTC and the mach-time clock.

At step 606, the real-time clock may latch a value $T_{R2}$ and may send this value to the applications processor via the power management unit. At step 608, the applications processor may receive $T_{R2}$ from the power management unit and in response to receive this RTC value, may latch a time tag $T_{M2}$. Assuming the time to send tag $T_{R2}$ from the PMU to the applications processor is negligible, the applications processor may be used to compute offset ΔY between RTC and MTC by taking the difference between $T_{M2}$ and $T_{R2}$ (e.g., $\Delta Y = T_{M2} - T_{R2}$), at step 610. Steps 611 (i.e., steps 606, 608, and 610) may therefore be used to identify an amount of offset ΔY between the mach-time clock at the applications processor and the real-time clock associated with the power management unit.

At step 612, the applications processor may be used to compute offset ΔX between UTC and RTC by calculating the sum of ΔZ obtained during step 604 and ΔY obtained during step 610. Depending on the current state of the RTC counter and the MTC counter, offsets ΔZ and ΔY can either have positive or negative values. The steps of FIG. 6 can be periodically performed to compute offset ΔX. Offset ΔX can be stored at the storage and processing circuitry within the device (e.g., circuitry 28 of FIG. 3 and circuitry 200 of FIG. 4). With accurate stored ΔX values, a sufficiently accurate approximation of UTC can be calculated at any given point in time by applying this offset to the RTC value without having to connect to any GPS satellites and without retrieving timing information from the Internet using the Network Time Protocol.

Figure 7:
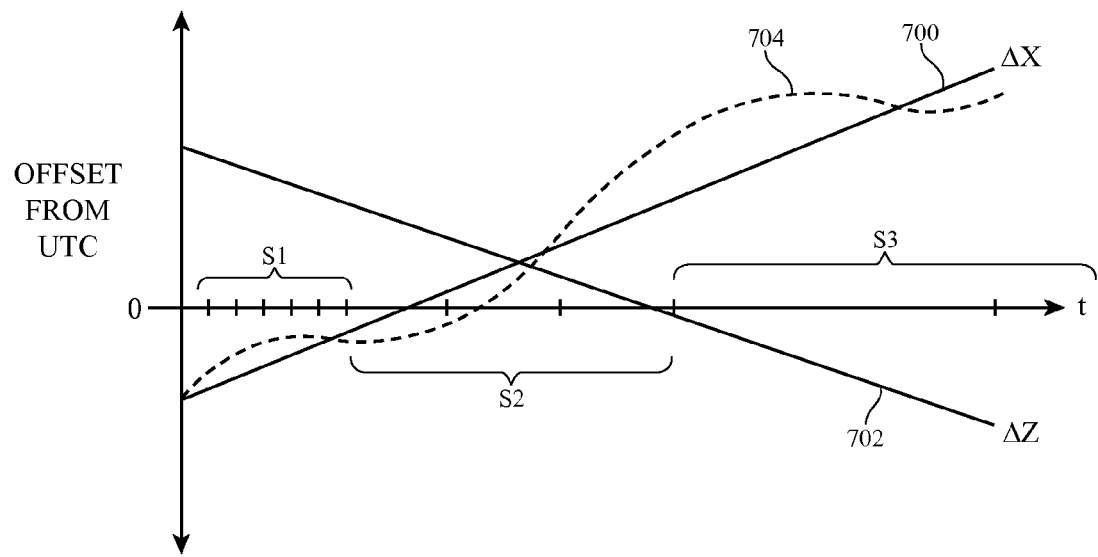
FIG. 7 is a timing diagram showing how on-device counters can drift from the coordinated universal time clock (UTC) in accordance with an embodiment.

The example of FIG. 5 assumes that the offset of the real-time clock and the mach-time clock from UTC stays constant. In practice, however, the oscillators (e.g., crystal oscillators, MEMS oscillators, and/or other suitable types of oscillators) being used to implement the real-time clocks and the mach-time clocks can exhibit frequency drifts over time, which can cause the amount of offset to change as time passes. FIG. 7 is a diagram plotting offset from UTC versus time. Line 700 plots offset ΔX (i.e., the offset between UTC and RTC) as a function of time, whereas line 702 plots ΔY (i.e., the offset between RTC and MTC) as a function of time.

In general, any frequency drift at a crystal oscillator is relatively consistent, and as a result, the rate of change in offset is constant. In other words, lines 700 and 702 can actually be modeled as linear expressions with a constant slope. Lines 700 and 702 may generally have different slopes. In the example of FIG. 7, line 700 may have a positive slope (e.g., the RTC oscillator may exhibit decreasing frequencies, which causes the difference between the UTC and RTC to increase over time) while line 702 may have a negative slope (e.g., the MTC oscillator may exhibit increasing frequencies, which causes the difference between the UTC and the MTC to decrease over time). This is merely illustrative. In other scenarios, lines 700 and 702 may have the same slope.

In some embodiments, the amount of frequency drift can also vary as a function of operating parameters such as temperature, humidity, pressure, and vibration. Line 704 in FIG. 4 shows how offset $\Delta X$ changes as a function of temperature. The dependence of the offset on temperature can be characterized by taking offset samples while recording corresponding device temperature levels using a temperature sensor (not shown). The temperature sensor may generally be placed in close proximity to the oscillator of interest (e.g., within 1 mm of the oscillator, within 5 mm of the oscillator, within 10 mm of the oscillator, etc.). The example of offset changing as a function of temperature is merely illustrative. In general, the change in offset as a function of other operating parameters can be characterized using any suitable sensor mechanism in the electronic device.

Whether or not the offset changes as a function of operating parameters such as temperature, humidity, or pressure, the amount of drift exhibited by a crystal oscillator (if present) can generally be modeled by a linear function, as described above. As shown in FIG. 7, first samples S1 may be obtained at a first frequency during a first time period. During the first time period, a larger number of samples may be taken to properly model the frequency drift behavior (assuming there is no prior knowledge of drift behavior). During a second time period following the third time period, second samples S2 may be obtained at a second frequency that is lower than the first frequency. During a third time period following the second time period, third samples S3 may be obtained at a third frequency that is yet lower than the second frequency. In general, fewer samples need to be obtained to update the linear model as the linear model matures. Even when the drift model is well characterized, offset samples may still be periodically taken to ensure that nothing drastic has changed at the crystal oscillator (e.g., to ensure that the frequency drift is still as expected).

Figure 8:
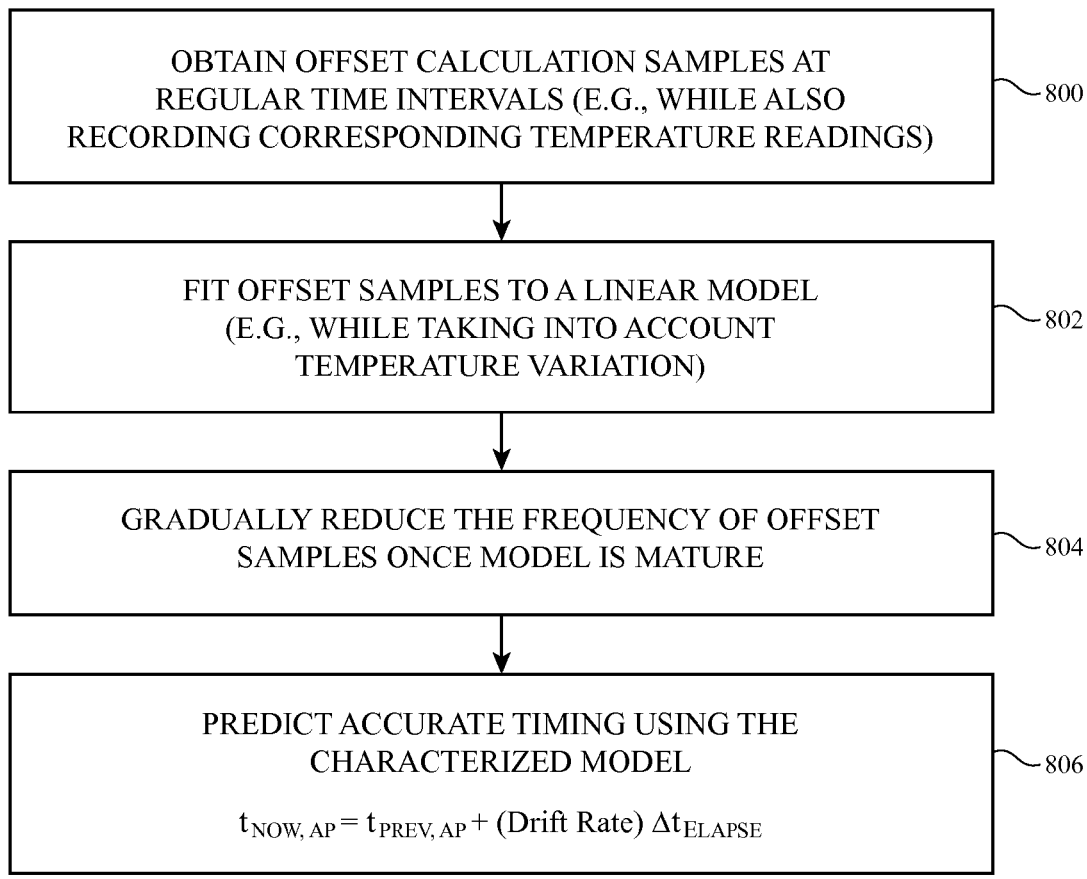
FIG. 8 is a flow chart of illustrative steps involved in modeling the drift of FIG. 7 and in predicting accurate timing using the drift model in accordance with an embodiment.

FIG. 8 is a flow chart of illustrative steps involved in modeling the drift described in FIG. 7 and in predicting accurate timing using the drift model. At step 800, the applications processor may be used to compute offset values at regular time intervals. If desired, one or more sensors on the device may be used to monitor a corresponding parameter such as temperature when the offset values are being computed.

At step 802, the applications processor may fit the computed offset samples to a linear model (e.g., by finding the rate of drift associated with the MTC and/or the RTC). The linear model may also take into account any sources of variation such as temperature variation or humidity variation that causes the offset values to deviate from the ideal linear profile.

Once a sufficient number of samples have been obtained and once the linear model is relatively mature and predictable, the number of offset values that needs to be sampled may be gradually reduced (e.g., so that the applications processor can dedicate its resources to other device operations). As shown in FIG. 7, the frequency at which samples S1 are obtained is higher than the frequency at which samples S2 are obtained, and the frequency at which samples S2 are obtained is greater than the frequency at which samples S3 are obtained.

At step 806, accurate time can be computed using the characterized linear model by adding the previously recorded time value the product of the drift rate (e.g., the slope of the linear function) and the amount of time elapsed since the previous time value was recorded, as shown in the following equation:

$$t_{NOW,AP} = t_{PREV,AP} + (\text{Drift Rate}) * \Delta t_{ELAPSE}$$

where $t_{PREV,AP}$ represents the previously recorded mach time, where the "Drift Rate" is equal to the rate at which offset changes over time (as modeled using the linear function), where $\Delta t_{ELAPSE}$ represents the amount of time that has passed since $t_{PREV,AP}$ was previously recorded, and where $t_{NOW,AP}$ represents the currently predicted mach time. This is merely illustrative. RTC can also be predicted/approximated with relatively high accuracy using this method.

In one suitable arrangement, the steps described in connection with FIGS. 6-8 may be performed using the primary user device 10 to maintain accurate timing information (e.g., to make sure that RTC and MTC can be accurately mapped to UTC). The primary user device 10 may then be used to transfer this timing information to the secondary user device 102 to ensure that the two associated user devices are synchronized to a common time base. Using only one of multiple portable electronic devices to maintain accurate time and then using that device to transfer time to other associated devices may be more resource efficient for the system as a whole.

Figure 9:
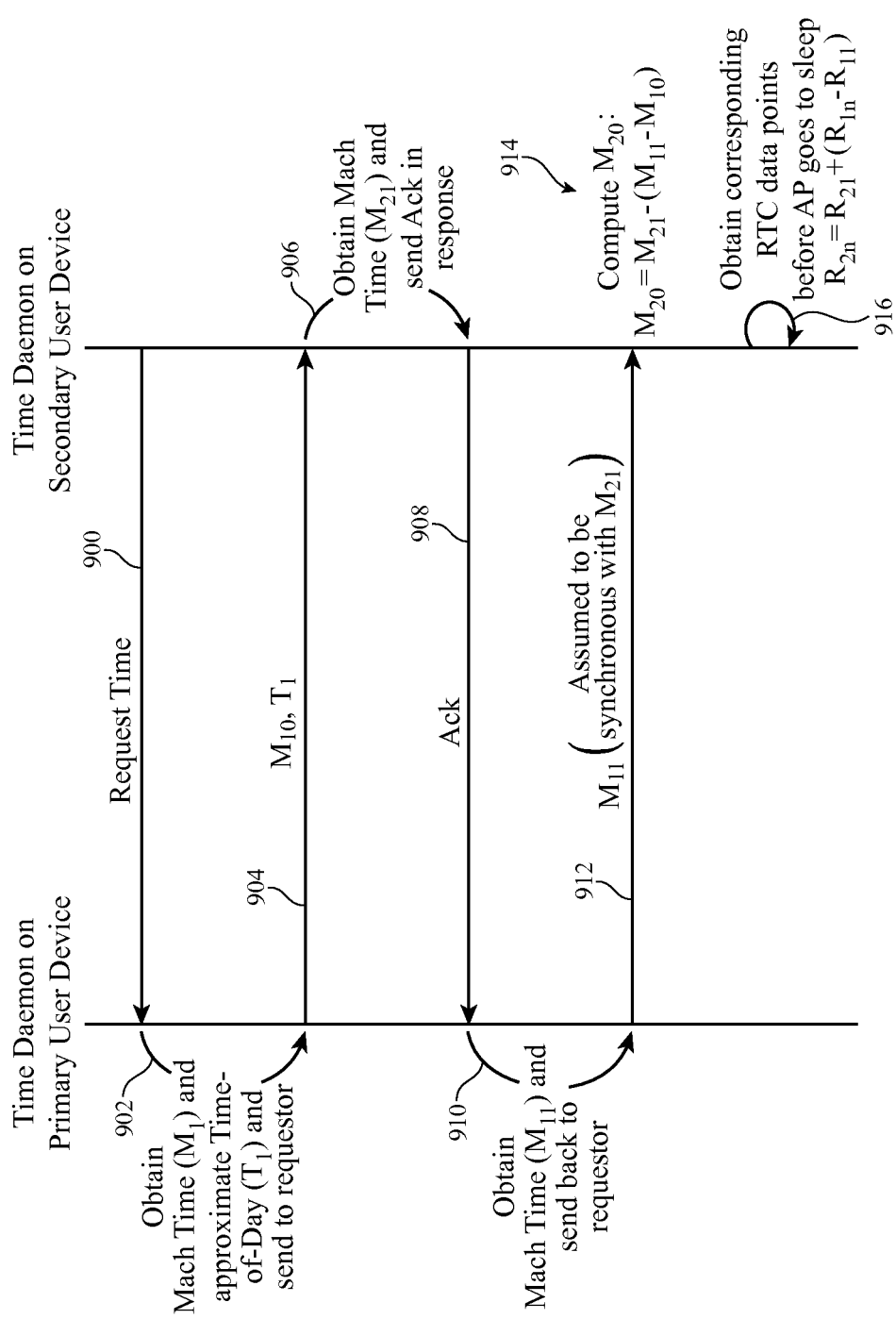
FIG. 9 is a diagram showing how timing information may be transferred from a primary user device to a secondary user device in accordance with an embodiment.

FIG. 9 is a diagram showing how timing information may be transferred from a primary user device to a secondary user device to synchronize the secondary user device to the primary user device. As shown in FIG. 9, a time daemon on the primary user device may be used to communicate with a corresponding time daemon on the secondary user device when exchanging timing information. In general, the communications path between primary user device 10 and secondary user device 106 may be supported via Bluetooth® (e.g., via Bluetooth Low Energy and/or Bluetooth "Classic" technologies), IEEE 802.11 protocols—sometimes referred to as WiFi®, or other short-range wireless communications technologies (as examples).

At step 900, the secondary user device may send a time transfer request to the primary user device. In response to receiving the time transfer request from the secondary user device, the primary user device may obtain a wake-only (mach-time) counter value $M_{10}$ and an approximate time-of-day $T_1$ (step 902). Counter value $M_{10}$ may be maintained at applications processor 28 on primary user device 10 (see, FIG. 3). The approximate time-of-day value $T_1$ may, for example, be computed based on the current RTC value and the current offset $\Delta X$ (while taking into account any drift in the offset) or may be computed based on the current MTC and the current total offset $\Delta Z$ (see, e.g., FIG. 6).

At step 904, $M_{10}$ and optionally $T_1$ may be sent to the secondary user device. In response to receiving $M_{10}$ and $T_1$, the secondary user device may obtain a wake-only (mach-time) counter value $M_{21}$ (step 906). Counter value $M_{21}$ may be maintained at applications processor 200 on secondary user device 102 (see, FIG. 4). The secondary user device may then immediately send an acknowledge response "Ack" back to the primary user device (step 908). The amount of time between latching $M_{21}$ and transmitting Ack may be minimal (e.g., the delay may be 150 µs or less, 100 µs or less, 50 µs or less, etc.).

At step 910, the primary user device may receive the Ack from the secondary user device and may obtain a corresponding wake-only counter value $M_{11}$. The difference between $M_{11}$ and $M_{10}$ may represent a time-to-send (or time elapsed) amount. At step 912, $M_{11}$ may be transmitted from the primary user device to the secondary user device. In this particular implementation, $M_{11}$ is assumed to be synchronous to $M_{21}$.

At step 914, value $M_{20}$ at the secondary user device, which corresponds to the time that $M_{10}$ was latched at the primary user device, may be computed based on all the time stamp information received at the secondary user device. For example, $M_{20}$ may be calculated by subtracting the time-to-send amount from $M_{21}$ (e.g., $M_{20}=M_{21}-[M_{11}-M_{10}]$). By computing $M_{20}$ according to the information sent from the primary user device, the timing of the secondary user device may be synchronized to that of the primary user device.

If desired, an updated local approximation of UTC may also be computed based on the received $T_1$ value and the time-to-send amount. As an example, a time $T_2$ may be computed by the secondary user device by adding time-to-send amount $[M_{11}-M_{10}]$ to $T_1$.

Since the wake-only "mach" time is generally not considered a "durable" metric (i.e., since the wake-only counter can pause when the applications processor goes idle), it may be desirable to map the local mach time values to corresponding RTC data points on the secondary user device (step 916).

In general, each of the primary and secondary user devices may map the wake-only (MTC) counter values to corresponding persistent (RTC) counter values whenever new wake-only counter values are being latched (e.g., at step 902, at step 906, and/or at step 910). In the example of FIG. 9, $R_{21}$ value may represent a persistent counter value that corresponds to $M_{21}$, whereas $R_{11}$ may represent a persistent counter value that has been mapped to $M_{11}$. While $R_{21}$ may be kept locally at the secondary user device, $R_{11}$ may be received at the secondary user device from the primary user device. Once these values are known, whenever the secondary device receives a new persistent counter value $R_{1n}$ at some later point in time, the secondary device is able to compute a corresponding synchronized persistent counter value $R_{2n}$ using the formula shown in FIG. 9 (e.g., $R_{2n}=R_{21}+(R_{1n}-R_{11})$).

In general, the applications processor may be configured to periodically store the offset between the estimated time-of-day (i.e., the estimated UTC) and the RTC so that the current time-of-day can be calculated even after the device goes to sleep and wakes up some indeterminate period of time later (e.g., to store offset $\Delta X$ described in connection with FIGS. 5 and 6). If desired, the time transfer procedure of the type shown in FIGS. 9 and 10 may be performed at any desired interval to ensure that accurate timing information is synchronized between the primary and secondary user devices. In yet other suitable arrangements, the methods described herein may be extended to a system with any number of related user devices, where one or more control devices may be used to obtain accurate timing information, and these devices may then be used to transfer its timing information to the remaining auxiliary devices.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method of transferring timing information from a primary user device to a secondary user device, comprising:
   receiving from the secondary user device a time transfer request at the primary user device; and
   in response to receiving the time transfer request from the secondary user device, using the primary user device to obtain a first wake-only counter value that is maintained at an applications processor on the primary user device, wherein the first wake-only counter value continues to increment when the applications processor on the primary user device is active and stops incrementing when the applications processor on the primary user device is in sleep mode.

2. The method defined in claim 1, further comprising:
   sending the first wake-only counter value from the primary user device to the secondary user device.

3. The method defined in claim 1, further comprising:
   obtaining an approximation of the Coordinated Universal Time (UTC); and
   sending the first wake-only counter value and the approximation from the primary user device to the secondary user device.

4. The method defined in claim 2, further comprising:
   receiving an acknowledgement from the secondary user device at the primary user device; and
   in response to receiving the acknowledgement from the secondary user device, using the primary user device to obtain a second wake-only counter value that is maintained at the applications processor on the primary user device, wherein the second wake-only counter value increments its value only when the applications processor on the primary user device is active and not in the sleep mode.

5. The method defined in claim 4, further comprising:
   sending the third wake-only counter value from the primary user device to the secondary user device.

6. The method defined in claim 1, wherein the primary user device exchanges timing information with the secondary user device via Bluetooth® technologies.

7. A method of operating a portable electronic device, comprising:
   sending a time synchronization request to an associated companion electronic device;
   after sending the time synchronization request, receiving a corresponding first counter value from the associated companion electronic device;
   in response to receiving the first counter value from the associated companion electronic device, obtaining a second counter value that is maintained at an applications processor on the portable electronic device;
   after obtaining the second counter value, sending an acknowledgement to the associated companion electronic device; and after sending the acknowledgement to the associated companion electronic device, receiving a corresponding third counter value from the associated companion electronic device.

8. The method defined in claim 7, wherein the portable electronic device comprises a wrist-watch device.

9. The method defined in claim 7, further comprising:
computing a wake-only time value that corresponds to the first time value based on the first counter value, the second counter value, and the third counter value.

10. The method defined in claim 9, further comprising:
computing a persistent counter value that corresponds to the second counter value, wherein the persistent counter value continues to increment even when the applications processor on the portable electronic device is in sleep mode.

11. A method of operating a portable electronic device, comprising:
receiving a time synchronization request from an associated accessory electronic device;
in response to receiving the time synchronization request, sending a corresponding first counter value that is maintained at an applications processor on the portable electronic device to the associated accessory electronic device;
receiving an acknowledgement from the associated accessory electronic device; and
after receiving the acknowledgement from the associated accessory electronic device, sending a corresponding second counter value that is maintained at the applications processor on the portable electronic device to the associated accessory electronic device.

12. The method defined in claim 11, further comprising:
computing a persistent counter value that corresponds to the first and second counter values, wherein the persistent counter value continues to increment even when the applications processor on the portable electronic device is in sleep mode.

13. A method of transferring timing information from a cellular telephone to a wrist-watch device, comprising:
receiving from the wrist-watch device a time transfer request at the cellular telephone;
in response to receiving the time transfer request from the wrist-watch device, using the cellular telephone to obtain a first counter value that is maintained at an applications processor on the cellular telephone;
sending the first counter value from the cellular telephone to the wrist-watch device;
receiving an acknowledgement from the wrist-watch device at the cellular telephone;
in response to receiving the acknowledgement from the wrist-watch device, using the cellular telephone to obtain a second counter value that is maintained at the applications processor on the cellular telephone; and
sending the second counter value from the cellular telephone to the wrist-watch device.

14. The method defined in claim 13, wherein the first counter value continues to increment when the applications processor on the cellular telephone is active and stops incrementing when the applications processor on the cellular telephone is in sleep mode.

15. The method defined in claim 14, wherein the second counter value continues to increment when the applications processor on the cellular telephone is active and stops incrementing when the applications processor on the cellular telephone is in the sleep mode.

* * * * *